Patented June 25, 1946

2,402,538

UNITED STATES PATENT OFFICE 2,402,538

MANUFACTURE OF COLORING MATTERS

Henry Dreyfus, London, England, assignor to Celanese Corporation of America, a corporation of Delaware No Drawing. Application May 3, 1941, Serial No. 391,705. In Great Britain June 3, 1940

4 Claims. (Cl. 260—208)

This invention relates to new methods of making water-soluble dyes and other compounds, and especially water-soluble dyes which are suitable for the coloring of cellulose acetate and other cellulose ester or ether materials.

According to the present invention water-soluble dyes are obtained by the action of salts of sulphurous acid on dyes containing unsaturated linkages and particularly on dyes containing ethylene linkages. The unsaturated linkage is thereby converted into a saturated linkage and a sulphur-containing acid group attached to one of the carbon atoms united by the said linkage. The products are probably sulphonic acids formed by addition of the sulphite or bisulphite to the unsaturated linkage.

Alternatively, in accordance with the invention, the same or similar dyes are obtained by first acting with salts of sulphurous acid on dye components containing unsaturated linkages and converting the water-soluble dye components so obtained into dyestuffs.

According to a further feature of the invention, instead of using salts of sulphurous acid for the treatment of dyes or dye components containing unsaturated linkages, sulphur trioxide or chlorsulphonic acid is employed. By this treatment products which are possibly carbyl sulphates are obtained and these, upon treatment with water, yield water-soluble products which are believed to be sulphonic acids.

In the parent dyes or dye components the unsaturated linkage is preferably in an aliphatic radicle. Such aliphatic radicles containing ethylene linkages are allyl, vinyl and oleyl. The unsaturated linkage may, however, be in another type of radicle, for example in a cycloaliphatic radicle, e. g. the cyclohexenyl radicle.

The aliphatic or other radicles containing the unsaturated linkages can be united to the aryl nuclei of the dyes or dye components in a wide variety of ways. For example they can be united directly to the said nuclei or united to the said nuclei by nitrogen, oxygen, sulphur, or by an ester grouping or an acidylamino grouping, as illustrated for instance by the following formulae:

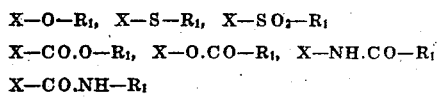

In these formulae X indicates a dye nucleus or a nucleus of a dye component, $R_1$ represents an aliphatic or other radicle containing an unsaturated linkage and $R_2$ represents hydrogen or alkyl or other substituent.

In the case of producing dyes for cellulose acetate or other cellulose esters or ethers it is preferable that but one sulphonic acid or like group should be introduced by the action of the salt of sulphurous acid or by the sulphur trioxide or chlorsulphonic acid, and hence that the parent dye or dye component should contain but one unsaturated linkage.

The dyes treated or produced in accordance with the invention can be of various series, for example they may be of the azo series or the anthraquinone series or they may be dyes having nitro groups as the sole chromophores and particularly those of this kind which contain two or more aryl radicles linked directly as in diphenyl and similar diaryl compounds, or indirectly, e. g. through an oxygen atom, a sulphur atom or a —$CH_2.CO$— or —$CO.NH$— group, or an —NR— group wherein R is hydrogen or a substituent, e. g. alkyl.

As examples of dyes containing unsaturated linkages and suitable for treatment in accordance with the invention may be mentioned the azo dyes obtainable by diazotising amino-benzenes or aminoazobenzenes, e. g. aniline, toluidines, anisidines, phenetidines and cresidine and their nitro and halogen derivatives or aminoazobenzene, 4-nitro-4'-amino-azobenzene, and 4-nitro-4'-amino-2'-methyl-5'-methoxy-azobenzene, and coupling the diazo compounds so obtained with para-coupling aminobenzenes and aminonaphthalenes having as N-substituents unsaturated alkyl groups, e. g. allyl or vinyl. Examples of such amines are the N-allyl-N-ethyl derivatives of aniline, m-toluidine, cresidine, 2:5-dialkoxy-anilines, p-xylidine and α-naphthylamine. Further there may be used the azo dyes obtainable by coupling with amines, phenols or other coupling components, diazo derivatives of primary amino benzenes which have as nuclear substituents hydroxy groups or mercapto groups etherified with unsaturated groups, e. g. allyl, vinyl or cyclohexenyl. Again the process may be applied to azo dyes made by diazotising an aminostilbene or an amino-styrene and coupling with an amine, phenol, or other coupling component.

Anthraquinone dyes treated in accordance with the invention preferably contain amino or substituted amino groups in the 1- and/or the 4-positions. As examples may be mentioned 1-allyl-amino-anthraquinone, 1-methyl-amino-4-allylamino-anthraquinone and 1-allyl-amino-4-phenylamino-anthraquinone.

Suitable nitro dyes containing two or more aryl nuclei linked together are, for example, 2:4-dinitro-4'-(ethyl-allylamino)-diphenylamine, 3-nitro-4-allylamino-diphenyl and 1-benzoylamino-3-allylamino-4-nitro-benzene.

These parent dyes containing unsaturated linkages can be made (as indicated above in the case of the azo dyes) from appropriate components containing unsaturated linkages. For example dyes containing unsaturated linkages and two aryl radicles linked together, and having nitro groups as the sole chromophores, can be obtained by the following methods:

(a) Interaction of a nitrohalogenbenzene with an aminobenzene having, as a nuclear substituent either (i) an amino group carrying an unsaturated aliphatic group, or (ii) a hydroxy or mercapto group etherified with an unsaturated aliphatic group. For example 2-nitrochlorobenzene or 2:4-dinitrochlorbenzene can be caused to react with p-aminophenol allyl ether or with 4-amino-N-methyl-N-allyl-aniline.

(b) By nitrobenzoylation of an aminobenzene having, as a nuclear substituent, an amino group carrying an unsaturated aliphatic group. For example p-nitrobenzoyl chloride can be allowed to react with 4-amino-N-methyl-N-allyl-aniline.

Again, the parent dyes can be made by alkylation of appropriate compounds with alkylating agents capable of introducing an unsaturated alkyl group. For example 1-allylamino-anthraquinone and 1 - allylamino-4-phenylamino-anthraquinone can be obtained by the action of allyl chloride on 1-amino-anthraquinone and 1-amino - 4 - phenylamino - anthraquinone respectively.

An alternative method of producing the parent dyes containing unsaturated linkages is to dehydrate a dye containing an aliphatic hydroxyl group, for example a dye containing a hydroxyalkyl group or a hydroxy-cyclohexyl group. The unsaturated linkage is formed by loss of the elements of water.

The invention extends to the production broadly of water soluble compounds containing acid groups by subjecting to the action of a sulphite, or to the successive action of sulphur trioxide or chlorsulphonic acid and water, a compound containing an ethylenic or other unsaturated linkage in an aliphatic or cyclo-aliphatic group attached to an aryl radicle. The aliphatic or cycloaliphatic group can for instance be attached to the aryl radicle in any of the ways hereinbefore indicated in connection with dyes containing such groups. As already indicated, compounds in which an aliphatic hydrocarbon radicle containing an ethylenic linkage is present as an N-substituent in an aminobenzene or an amino naphthalene yield, when treated in accordance with the invention, water-soluble products useful for the production of azo dyes by coupling with diazo compounds. Again compounds which are ethers of aromatic hydroxy compounds, and in which an etherifying radicle is an aliphatic hydrocarbon radicle containing an ethylenic linkage, can be treated with sulphite or sulphur trioxide or chlorsulphonic acid in accordance with the invention in order to obtain water-soluble products suitable for use as dye components or for other purposes, e. g. as textile assistants, wetting agents, or dispersing agents. For instance, compounds which contain a primary amino group in addition to the ether group yield products suitable for use as diazo components or coupling components in the manufacture of azo dyes. Further, hydroxy benzenes or hydroxy-naphthalenes etherified with aliphatic hydrocarbon radicles containing ethylenic linkages (e. g. the oleyl or allyl ether of phenol, cresols, or alpha- or beta-naphthol) yield water-soluble products suitable for use as wetting or dispersing agents.

When using salts of sulphurous acid for the treatment of the dyes or other compounds containing unsaturated linkages, it is preferred to employ aqueous solutions of alkali metal sulphites or bisulphites. Reaction can be effected at ordinary temperatures though higher temperatures, up to or above the boiling point of the aqueous solutions at atmospheric pressure can be employed. When using such temperatures above the boiling point at atmospheric pressure the reaction is carried out at super-atmospheric pressure. The dyes or other compounds treated will usually be insoluble in the sulphite solution in which case it is advantageous for them to be in finely divided form. Liquid compounds can for instance be emulsified in the sulphite solution, e. g. with the aid of kieselguhr or other water-insoluble emulsifying agent. The desired water-soluble dyes or other compounds are thereby produced in the form of alkali metal salts.

When sulphur trioxide or chlor sulphonic acid is employed as the agent for treating the dyes or dye components containing the unsaturated linkages, it is preferred to employ about two molecules of $SO_3$ or two molecules of chlor sulphonic acid for each unsaturated linkage present. The treatment is preferably effected at a low temperature, e. g. below 0° C. and advantageously in the presence of an inert diluent such as carbon tetrachloride. As mentioned above the initial products are in this case probably of the type of carbyl sulphate. These initial products are then decomposed by the action of water, and preferably by boiling with water, in order to obtain the desired water-soluble dyes.

Dyes produced according to the present invention can be used for the coloring of cellulose acetate or other cellulose ester or ether materials from aqueous baths which may be neutral, or slightly acid, or slightly alkaline. Such cellulose esters and ethers may be, for example, cellulose acetate itself, as already indicated, or cellulose formate, propionate or butyrate, or methyl, ethyl or benzyl cellulose.

The invention is illustrated but not limited by the following examples, the "parts" referred to being parts by weight.

*Example 1*

13.8 parts of p-nitraniline are diazotised and coupled with 14.8 parts of N-methyl-N-allyl-aniline. The resulting orange azo-dye is filtered off, washed, and the wet paste mixed with 30 parts of sodium bisulphite and sufficient water to make the water content of the mixture 500 parts. The whole is allowed to stand for 3 weeks at ordinary temperature being stirred well at intervals. The resulting dye is filtered off, washed with brine and purified by solution in water and precipitation with brine. It dyes cellulose acetate in orange shades from an aqueous bath.

*Example 2*

15 parts of N-methyl-N-allyl-aniline are mixed with 30 parts of kieselguhr and 30 parts of sodium bisulphite dissolved in 500 parts of water. The mixture is allowed to stand for three weeks at ordinary temperature, being stirred well at intervals. The small amount of oil remaining is distilled off with steam and the liquid filtered from kieselguhr. The residue on the filter is washed with boiling water. The united filtrates are heated to boiling point and barium hydroxide added (as a hot concentrated solution) about 25% in excess of that required to precipitate the remaining sulphite. After boiling for a short time and neutralising with sulphuric acid, the barium sulphite and barium sulphate are filtered off.

The liquid, which apparently contains N-methyl-N-sulphopropyl-aniline, is cooled to 0–5° C. with ice, and an ice cold diazo solution prepared in the usual manner from 13.8 parts of p-nitraniline is run in (together with sufficient sodium acetate solution to neutralise mineral acid) until no more coupling takes place. The resulting azo dye is filtered off, washed with brine, and purified by solution in water and precipitation with brine. It dyes cellulose acetate in orange shades from an aqueous bath.

Example 3

By substituting an equal quantity of p-aminophenol-allyl ether for the N-methyl-N-allyl aniline referred to in Example 2 and carrying out the treatment with sodium bisulphite described in that example, an aqueous solution containing what is believed to be the sulpho-propyl-ether of p-aminophenol is obtained. To this solution, cooled with ice to 0–5° C., is added 40 parts of concentrated hydrochloric acid and diazotisation is effected by running in a 20% aqueous solution of sodium nitrite until the usual test with starch-iodide shows that diazotisation is complete. The diazo solution is then run into a cold solution of 15 parts of p-hydroxy-diphenyl in 500 parts of water containing 4 parts of caustic soda, the liquid being maintained alkaline throughout by simultaneous addition of sodium carbonate solution. The resulting dye is filtered off and washed with brine. It dyes cellulose acetate in yellow shades from an aqueous bath.

Example 4

15 parts of N-methyl-N-allyl-aniline are slowly added to 25 parts of sulphur trioxide in 200 parts of carbon tetrachloride cooled to —10° C. After stirring for one hour the product is poured on to 400 parts of ice. The whole is then heated to 50° C., rendered alkaline by addition of aqueous caustic soda solution, and subjected to steam distillation to remove the carbon tetrachloride. The resulting aqueous solution apparently contains N-methyl-N-(hydroxy-sulpho-propyl)-aniline and can be coupled with diazotised p-nitraniline in the manner described in Example 1. The resulting azo dye dyes cellulose acetate in orange shades from an aqueous bath.

Example 5

30 parts of the anilide of oleic acid are stirred at 40° C. for one week with a solution of 30 parts of sodium bisulphite in 500 parts of water. The mixture is then rendered slightly alkaline to litmus by addition of aqueous caustic soda solution and water distilled off under a pressure of 20 mm. of mercury until the boiling point reaches about 110° C. The residue is then boiled with 10 times its weight of methylated spirit, filtered from inorganic salts, and the spirit removed from the solution by evaporation, first at ordinary pressure and finally under a pressure of 20 mm. of mercury, without the temperature exceeding 110° C. The product is a valuable wetting and dispersing agent.

Having described my invention, what I desire to secure by Letters Patent is:

1. Process for the production of a water-soluble azo dye, which comprises subjecting to the action of a sulphite an azo dye obtainable by coupling a diazo-benzene with a para-coupling aminobenzene having, as a substituent in an amino group and directly attached to the nitrogen atom thereof, an aliphatic hydrocarbon radicle containing an ethylenic linkage, and thereby converting the ethylenic linkage into a saturated linkage and attaching a sulphonic group to one of the carbon atoms united by the said linkage.

2. Process for the production of an N-(sulphopropyl)-aminobenzene, which comprises subjecting to the action of a sulphite a para-coupling aminobenzene having an allyl group as a substituent in an amino group.

3. Process for the production of a sulphonic acid, which comprises subjecting to the action of a sulphite an aryl amine having, as a substituent in an amino group and directly attached to the nitrogen atom thereof, an aliphatic hydrocarbon radicle containing an ethylenic linkage and thereby converting the ethylenic linkage into a saturated linkage and attaching a sulphonic group to one of the carbon atoms united by the said linkage.

4. Process for the production of a water-soluble sulphonic acid dye, which comprises subjecting to the action of a sulphite a dye containing an amino group attached directly to an aromatic nucleus, said amino group having as a substituent and directly attached to the nitrogen atom thereof, an aliphatic hydrocarbon radicle containing an ethylenic linkage and thereby converting the ethylenic linkage into a saturated linkage and attaching a sulphonic group to one of the carbon atoms united by the said linkage.

HENRY DREYFUS.